United States Patent [19]

Hofmann et al.

[11] 4,427,847

[45] Jan. 24, 1984

[54] TELEVISON/TELEPHONE SYSTEM WITH ANNUNCIATOR AND INTERCOM FEATURE

[75] Inventors: Judson A. Hofmann, Schaumburg; Paul A. Snopko, Chicago, both of Ill.

[73] Assignee: Zenith Radio Corporation, Glenview, Ill.

[21] Appl. No.: 291,655

[22] Filed: Aug. 10, 1981

[51] Int. Cl.³ .......................................... H04M 11/08
[52] U.S. Cl. .................................. 179/2 TV; 179/37; 179/100 L; 358/85
[58] Field of Search .................... 179/1 H, 1 HF, 2 B, 179/2 TV, 37, 99 A, 100 L; 358/85; 455/74

[56] References Cited

U.S. PATENT DOCUMENTS

| | | |
|---|---|---|
| 3,355,546 | 11/1967 | King . |
| 3,492,418 | 1/1970 | Tanner . |
| 3,816,662 | 6/1974 | Shaver et al. ......................... 358/85 |
| 4,175,216 | 11/1979 | Kita et al. ........................... 179/99 A |
| 4,196,317 | 4/1980 | Bartelink ........................ 179/1 H X |
| 4,338,492 | 7/1982 | Snopko ............................. 179/2 TV |
| 4,349,701 | 9/1982 | Snopko ............................. 179/2 TV |
| 4,356,509 | 10/1982 | Skerlos et al. ................ 179/2 TV X |

OTHER PUBLICATIONS

*Elektor*, vol. 3, No. 9, Sep. 1977, pp. 9-18 to 9-25; "FM-Mains Intercom".

Primary Examiner—A. D. Pellinen

Assistant Examiner—Keith E. George

Attorney, Agent, or Firm—Jack Kail

[57] ABSTRACT

A television receiver comprises a television system energized by the powerlines of a commercial power grid, a telephone network access system including a microphone disposed in close proximity with the audio speaker of the television system and a remote control system enabling the receiver to be operated in a television mode or a telephone mode. The television receiver according to the invention is characterized by having an annunciator/intercom enabled for operation by the remote control system. In the annunciator mode, the audio section of the television system is disabled and the microphone is connected through a radio-frequency signal transmitter to the power lines for generating a radio-frequency signal for local transmission. A frequency-modulator is included for modulating the radio frequency signal. At least one remotely located radio-frequency receiver coupled to the power lines is provided for receiving and demodulating the radio-frequency signal and rendering audible television receiver user voice signals. The television receiver user can therefore announce a telephone caller when the television receiver is operated in the annunciator mode. Alternately, intercom units may be employed to provide a two-way intercom conversation link between the television receiver user and a remotely located called party.

24 Claims, 6 Drawing Figures

TELEVISON/TELEPHONE SYSTEM WITH ANNUNCIATOR AND INTERCOM FEATURE

CROSS-REFERENCE TO RELATED APPLICATIONS

This application is related to but in no way dependent upon copending applications of common ownership herewith including Ser. No. 109,424 filed Jan. 2, 1980 now U.S. Pat. No. 4,338,492, and its division application Ser. No. 175,456 filed Aug. 5, 1980 now U.S. Pat. No. 4,349,701.

BACKGROUND OF THE INVENTION AND PRIOR ART DISCLOSURES

This invention relates to television systems and is particularly concerned with means for enhancing the utility of the standard television receiver.

The use of the television receiver has been limited largely to its original purpose, which is to serve as a channel for broadcast television programming primarily for entertainment. The television receiver, however, has the potential to become a great deal more useful and important. The television receiver, which conveys both picture and sound, is a resource of immense potential because of its inherent capability in presenting complex video and audio information, and for its potential for interacting with other systems such as computers and video tape recorders. Another major and most significant benefit lies in the fact that there are so many television sets in use—most homes in the United States have at least one television set. So a basic capability with all its potential is to a great extent already in situ.

One of the most significant of the means for enhancing the potential of the receiver, is the remote control system by which the various functions of the receiver, such as ON-OFF, volume control, channel selection, mute, etc., can be controlled at a distance from the receiver. The remote control system commonly comprises a hand-held, battery-operated unit having a keypad including a numerical pad for control of the various functions. The link between the control and the receiver may be by wire, but more commonly, by signals such as radio frequency, ultrasonic or infra-red.

A recent and highly significant means for increasing the utility of the television receiver is disclosed in referent copending application Ser. No. 109,424 now U.S. Pat. No. 4,338,492 which discloses a television receiver comprising a cabinet housing a television system and a telephone network access circuit. The television receiver provides both for presentation of television programs and for conversing through the talk channel and listen channel of an associated telephone network. The receiver has at least one function control circuit including operational mode selection means for providing a television program mode, and alternately, a two-way telephone conversation mode. When the presence of a ringer signal from the telephone network is indicated, the television receiver user can activate the two-way telephone conversation mode and conduct a two-way conversation with the telephone caller through the television receiver. Upon termination of the conversation, the television receiver user can restore the television program mode. In referent copending application Ser. No. 175,456 now U.S. Pat. No. 4,349,701, a division of the aforesaid '424 application, there is disclosed a receiver providing for two-way telephone conversation with a dial-out facility.

Shaver et al in U.S. Pat. No. 3,816,662 discloses a combination telephone and video communication system for selectively enabling, from a given location in which a video terminal is provided, another video terminal at a desired one of a plurality of remote locations. Specifically, Shaver et al is concerned with an enabling arrangement in conjunction with intercom and door-answering systems for apartment buildings or the like. The purpose is to make it possible for the tenant in an apartment to converse with and to see a visitor calling from an entrance of the building.

King in U.S. Pat. No. 3,355,546 discloses a pay sound system for closed circuit television in which the audio component is conveyed via carrier current transmission. The system is intended for hotels, motels, community television services and other mass networks of television receivers which are connected by coaxial cable to central distribution amplifiers to which master antennas supply an input signal. The viewer may listen to the audio portion of a program by means of a conventional carrier current receiver tuned to a transmitted frequency. The receiver may be rented to the user on a time basis or it may be provided with a coin-controlled power input. The video information is routed to a plurality of television receivers by way of separate conductor. The intent appears to be to provide the viewer with the video information, but exact a charge for receiving the corollary audio information.

Tanner—U.S. Pat. No. 3,492,418 discloses a signal transmission system using DC control signals to selectively operate a television receiver as a monitor and to control an intercom system. The system is said to include a camera with one section of an audio intercom nearby. A television receiver and another section of the intercom are located at some distance from the camera. A switch near the receiver has a first position to connect the antenna to the receiver and to simultaneously turn off the camera and the intercom. A second section disconnects the antenna, connects the camera to the receiver, and turns the camera and intercom off. A cable connecting the camera to the receiver has a signal shielded conductor for transmission of the camera signal, the audio intercom signal and the power on-off control.

OBJECTS OF THE INVENTION

It is a general object of this invention to enhance the utility of the standard television receiver.

It is a less general object to enhance the utility of a television receiver having a two-way telephone conversation facility.

It is a more specific object of the invention to enable users of television sets having a two-way telephone conversation facility to communicate with called parties at remote locations.

BRIEF DESCRIPTION OF THE DRAWINGS

The appended claims set forth those novel features believed characteristic of the invention. However, the invention itself, as well as further objects and advantages thereof, will best be understood by reference to the following detailed description of a preferred embodiment taken in conjunction with the accompanying drawings, in which:

DESCRIPTION OF THE PREFERRED EMBODIMENTS

Figure 1:
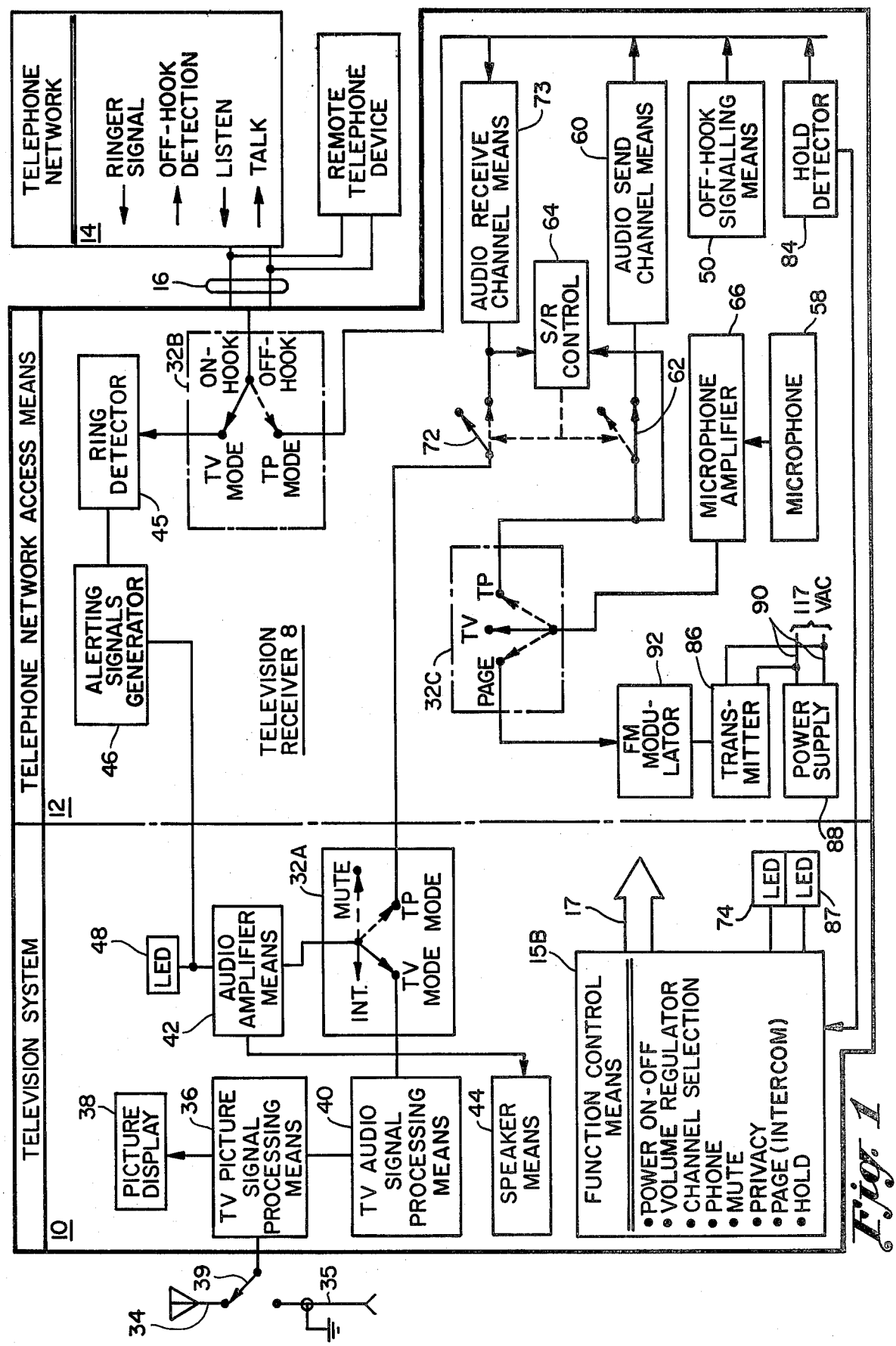
FIG. 1 is a partially functional block diagram of a preferred embodiment of the television receiver with annunciator means according to the invention.

FIG. 1 is a block diagram of a television receiver 8 according to the invention comprising a cabinet (diagramatically represented by the solid-line block identified by reference numeral 8) which houses a television system 10 and a telephone network access means 12. Television receiver 8 provides both for presentation of television programs and for conversing through the talk and listen channels of the associated telephone network 14. Television receiver 8 includes a function control system comprising a remote control transmitter 15A (see FIG. 2) and an associated remote control receiver 15B for operating the receiver 8 in a television program mode, and alternately, a two-way telephone conversation mode according to the inventions disclosed in referent copending application Ser. Nos. 109,424 and 175,456, respectively. The television program mode is abbreviated "TV mode" in the following, and the two-way telephone conversational mode is abbreviated "TP mode." While the function control system preferably comprises hand-held remote unit 15A operating in cooperation with receiver 15B integrated within television system 10 as illustrated in FIG. 1, the function control circuit may also comprise a circuit including suitable operating switches located on a control panel of the television system 10.

It is to be noted that the components shown in the section designated as television system 10 do not constitute the entirety of a standard television system, but only those components which interface according to the principles of the invention with telephone network access means 12. Television receiver 8 is shown as being connected to a telephone network 14 by means of the familiar two-wire tip and ring connection 16. The telephonic functions of telephone network 14 of relevance to television receiver 8 according to the invention, and the direction of each function; that is, whether into or out of the television receiver 8 are listed as comprising ringer signal, "listen", "talk", and off-hook signal detection, with the "in or out" directions indicated by the associated arrows.

Figure 2:
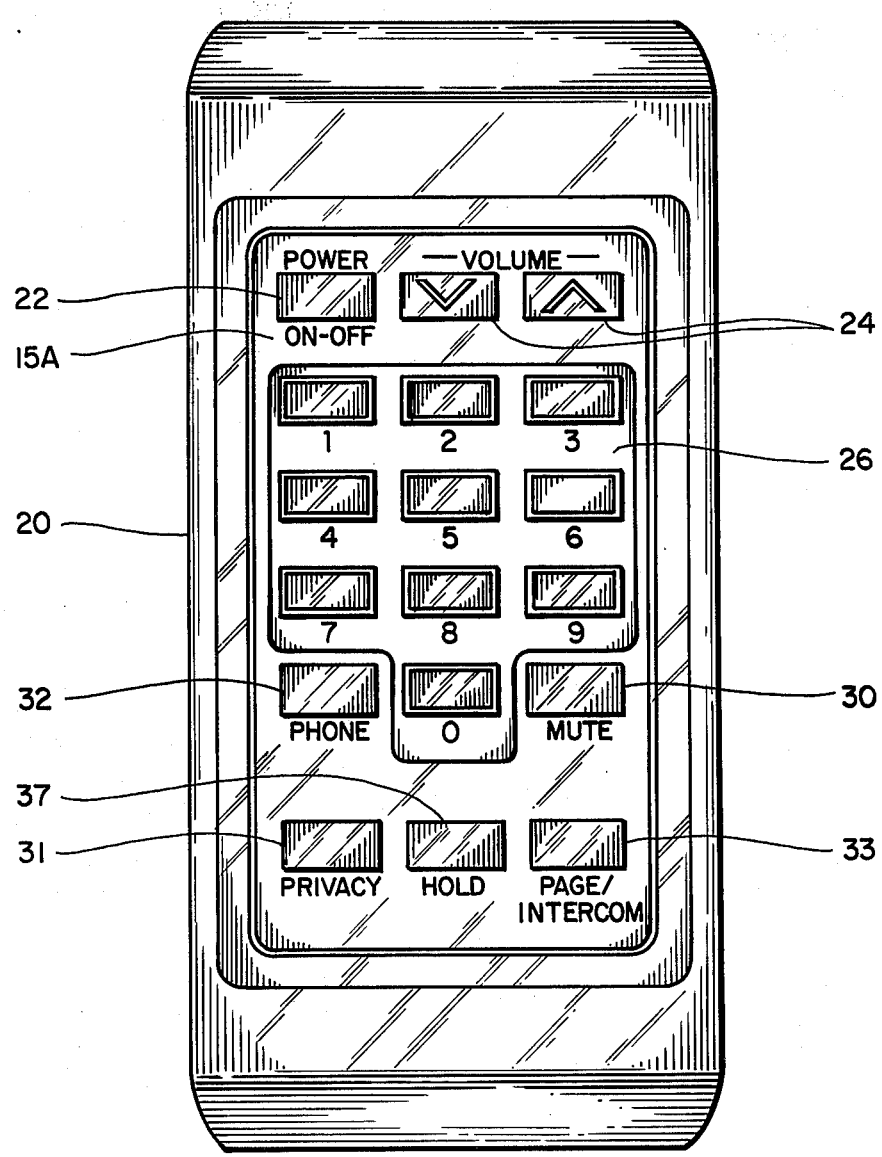
FIG. 2 is a plan view of a remote control unit providing control of the functions of the television receiver with annunciator means according to the principles of the invention.

With additional reference now to FIG. 2, there is shown a hand-held remote control unit 15A embodied in a convenient housing 20 as shown. All control buttons shown are utilized for control of the television system 10, the telephone network access means 12, and the annunciator and intercom functions according to the invention as will be shown. The appearance of the remote control unit 15A as depicted in FIG. 2 is for example only, and is not intended to be in any way limiting with regard to aspects such as the type of controls or their number, or aspects of layout or design. For example, the several controls depicted may be of the push-button switching type, or membrane type. It will of course, be appreciated that the foregoing functions of television receiver 8 are in actuality controlled by remote control receiver 15B which develops a plurality of output signals 17 for enabling the functions identified by the operation of unit 15A.

POWER ON-OFF switch 22 provides for on-off control of television receiver 8 while volume regulating switches 24 provide for regulating the volume of the audio amplifier of the television system 10, as well as the volume of a two-way telephone conversation conducted through television receiver 8. The direction of the arrows on the two volume controls 24 indicates that by depressing a particular button, the volume will go either up or down.

The numerical keypad 26, having arabic numerals 0 and 1-9, provides for television receiver channel selection when the system is operating in the TV mode. The MUTE control 30 provides for muting the television audio channel when the television receiver 8 is in the TV mode while the PRIVACY control 31 provides for achieving a privacy mode when conducting a two-way telephone conversation as will further be described hereinafter. A HOLD control 37 provides for placing a received call in a hold condition.

The PHONE control switch 32 when activated provides for initiating access to the telephone network 14. PHONE control switch 32 also provides for restoring the TV mode of operation when the system is in the TP mode.

Depression of PHONE control switch 32 results in remote control receiver 15B developing an output signal for operating a first, a second and a third switching means 32A, 32B and 32C for making appropriate electrical connections when switching from the TV mode to the TP mode, and vice-versa. First and third switching means 32A and 32C are preferably implemented in the form of suitable electronic switches responsive to output logic signals from remote control receiver 15B while switching means 32B preferably comprises an appropriate relay or the like.

The discussion of the operation of standard television components and circuits, being very well-known in the art, is limited to functions in relation to components and circuits of the novel means according to the invention. The following description is presented in the sequence of the use of the television programming capability, the telephone two-way conversation capability, and the annunciator function according to the invention, by the television receiver user.

When switching means 32A, 32B and 32C are in the TV mode, as a result of, for example, depression of power ON-OFF switch 22, television receiver 8 provides for presentation of television programs. The composite video signal as broadcast is received through antenna 34 or, alternately, through a cable 35, as indicated by the switch 39. A conventional television picture signal processing circuit 36 comprises a standard tuning stage, video IF amplifier stage, video detector, luminance channel, sweep circuits, and in color receivers, a chrominance channel, all of which cooperate to activate a picture display 38 to convert the video component of the broadcast television signal to a corresponding video image, picture display 38 normally comprising a cathode ray tube. A television audio signal processing circuit 40 provides for detecting the audio component of the composite signal following the video IF amplifier stage. The detected audio signal is coupled through switch 32A for application by an audio amplifier 42 which in turn drives one or more speakers 44. Audio amplifier 42 has the dual purpose of amplifying the audio portion of a received television program through speakers 44 as well as audio for voices during two-way telephone conversations.

While television receiver 8 is operating normally, telephone network access means 12 is monitoring telephone network 14 to detect a ringer signal, if one should occur. It will be noted that switches 32A, 32B and 32C are shown as providing for operation in the TV mode. Upon occurence of a ringer signal from telephone network 14, the signal is routed to a ring detector 45 of telephone network access means 12 which in turn is linked to an alerting signals generator 46. Alerting signals generator 46 provides for making the television receiver user aware of the presence of the ringer signal. The alerting signal may comprise, by way of example, a signal routed to an LED 48 mounted on the television receiver front panel or, alternatively, the alerting signal may be an audible signal heard by way of the audio amplifier 42 and speaker 44.

Upon being alerted to the existence of the ringer signal, the television receiver user depresses PHONE switch 32 located on remote control unit 15A. Switches 32A, 32B and 32C are consequently operated in response to remote control receiver 15B for making contact with the TP mode terminals. This is the "off-hook" condition which is sensed by an off-hook detector at the central office of the telephone network 14. The "off-hook" indication is provided by an off-hook signalling circuit 50 connected to the central office through switch 32B.

A two-way conversation is conducted by way of the telephone network 14 through television system 10 and telephone network access means 12 using a conventional "half-duplex" system. In the half duplex system, an audio send channel 60 (the "talk" mode) is disabled by a switch 62 while an audio receive channel 73 (the "listen" mode) is operating through a switch 72, and vice-versa, switches 62 and 72 being controlled by a well-known send-receive control circuit 64. Half-duplexing is required (although it is not mandatory as will be noted) because of the potential for regenerative acoustic feedback between the audio receive channel 73 and audio send channel 60. The audio send channel 60 includes a microphone 58 operating through an amplifier 66 and third switch 32C for transducing user voice signals during a telephone conversation. Microphone 58 is mounted on the front panel of the television receiver cabinet along with speaker 44, so feedback between the two would be highly likely. It should be noted that operation could be accomplished by means of full duplexing; that is, the receive and send channel means could both be open at the same time to provide for a two-way telephone conversation. Special provisions are made in a full duplexing circuit to prevent feedback. For the purpose of this disclosure, however, the half-duplexing system is described by way of example.

Depending upon the type of half-duplexing system used, the audio receive channel 73 may be normally "on" except when the audio send channel 60 is in use. Alternately, the audio send channel 60 may be normally "on" except when the audio receive channel 73 is in use. A third mode is "locked out," in which one channel is completely off when the other channel is in use; in this case, the user of the locked-out channel could not interrupt or otherwise gain control of the channel until the user of the channel had completed the communication.

The following functional circuit description is one in which the audio send channel 60 is considered for purposes of example to be normally on. Upon receipt of a ringer signal, the television receiver user watching a television program will depress PHONE switch 32 on remote control unit 15A thereby establishing the TP mode so that the caller may be greeted. The caller's response, heard via the audio amplifier 42 and speaker 44, will override the audio send channel 60 as the "listen" signal comes through the audio receive channel 73.

The television receiver according to one aspect of the invention is characterized by having an annunciator system as set forth below. An RF transmitter 86 coupled to the television receiver power supply 88 includes means for generating a radio-frequency signal for transmission through the common power lines 90 of an associated home power grid. Power supply 88 receives 117 VAC power, for example, from the powerlines 90 for enabling operation of television receiver 8. RF transmitter 86 may include means such as a standard RF oscillator circuit to generate a radio frequency signal of 120 kilohertz by way of example. An FM modulator 92 is connected for receiving the output of microphone 58, as amplified by audio amplifier 66 and coupled through switch 32C, for frequency modulating the 120 kilohertz signal with television user voice signals. Coupling of common power line 90 to RF transmitter 86 may be of the capacitive type, by way of example. The annunciator mode of operation is enabled by depressing the PAGE key or switch 33 on remote control unit 15A which, in cooperation with remote control receiver 15B, causes switch 32C to connect microphone 58 to transmitter 86 while an LED indicator 87 is illuminated in response to control unit 15B. Also, switch 32A is simultaneously established in the MUTE position to prevent acoustical feedback from speaker 44 to microphone 58 while switch 32B remains in its previously set position.

At least one RF receiver 94 remotely located from television receiver 8 is coupled to the common power line 90 of the power grid, and is tuned to receive the 120 kilohertz signal imposed on common power lines 90 by RF transmitter 86. As with the RF transmitter 86, coupling of the RF receiver 94 to the power line 90 may be by capacitive means. RF receiver 94 includes means for demodulating the audio component of the 120 kilohertz radio-frequency signal. Also included are means for amplifying the demodulated signal for energizing associated speaker means 96. Thus, by means of the annunciator system according to the invention, the television receiver user can announce a telephone caller to one or more selected remote locations.

The RF receiver means 94 are preferably relatively small units that can be plugged into a standard 117 VAC outlet, with speakers 96 built in. Power for operation of the receiver is derived from a standard AC-to-DC power supply. The use of micro-circuit technology can provide for highly miniaturized design. Most of the volume of the receiver would be taken up by the speaker 96 which may, for example, be a two-inch speaker offering acceptable fidelity for the one-way voice communication provided by the annunciator means according to the invention.

Figure 3A:
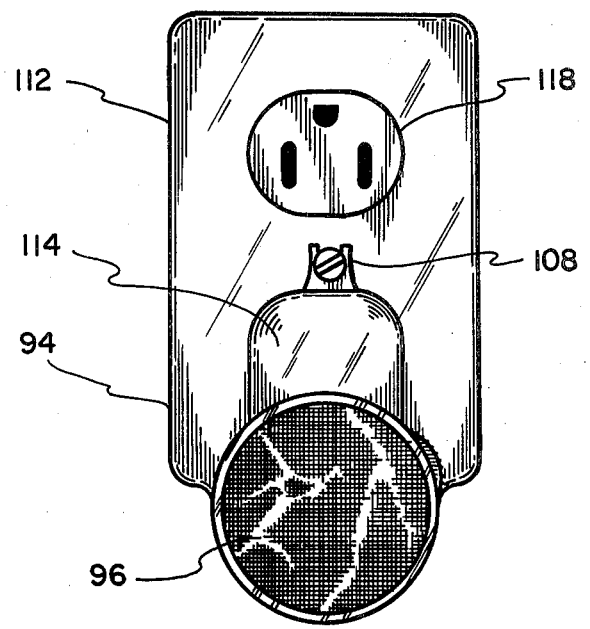
FIG. 3A is an elevational view of an RF receiver component according to the invention as installed in a standard 117 VAC electric wall socket.
Figure 3B:
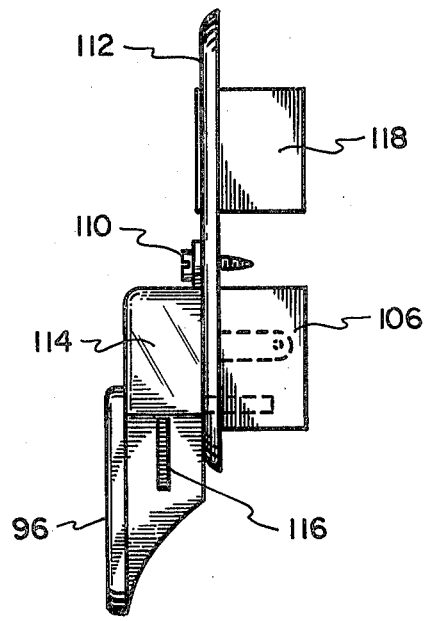
FIG. 3B is a view in profile of the installed receiver as shown by FIG. 3A.

FIG. 3A depicts a configuration of an RF receiver 94 for plugging into a standard 117 volt power line receptacle for receiving the voice signals transmitted by the RF transmitter 86 of the television receiver. RF receiver 94 includes speaker means 96 which may, as noted, be of 2-inch diameter. RF receiver 94, as shown in profile in FIG. 3B, is held firmly in socket 106 by a bifurcated bracket 108, shown as engaging the machine screw 110 which retains receptacle cover plate 112. The RF receiver may also be held in place by the spring tension of socket 106. The molded body 114 of RF receiver 94 contains the RF detector, f-m signal demodulator, audio amplifier, and receiver power supply circuits, all of which may be embodied in a single dual in-line package containing integrated circuit means well-known in the art. An optional coding switch 116, which may comprise a rotary switch actuatable by a knurled wheel, provides for setting a selected household code. RF receiver 94 could as well be rotated to plug into the upper receptable 118.

The range of the signal developed by RF transmitter 86 is limited in distance to the nearest powerline stepdown transformer or distribution transformer of the power grid. Any RF signal entering the transformer is normally greatly attenuated so it can travel no further over the power grid. If however there is more than one household served by the transformer, such as a group of two or three homes, or several apartments in a building, there is a probability of interference where several households may have television receivers with annunicators according to the invention. Such interference could, for example, cause an announcement made in one household to be heard in another.

A remedy is to build into the system a series of distinctive codes, selected ones of which can be assigned to a particular household. A code, which may comprise by way of example, a train of pulses forming a binary number preceding an announcement, would turn on only those RF receivers responsive to that particular code. Receivers with annunciators according to the invention can be manufactured with several codes and have means for easy selection and assignment of codes by the television receiver users. A coding switch 116 is indicated in FIG. 3B.

When television receiver 8 is in the television mode (TV mode) first, second and third switches 32A, 32B and 32C are, as depicted in FIG. 1, in the TV mode, the TV position of switch 32C comprising a no connection position. The television receiver 8 is thus in an "on-hook" condition while television audio and video is being produced and microphone 58 is disconnected. The ringer signal means of the telephone network 14 is connected via switch 32B to ring detector 45 which in turn is connected to alerting signals generator 46. TV audio signal processing means 40 is connected via switch 32A to audio amplifier 42, and normal television programming is seen and heard by the television receiver user.

Upon occurrence of a ringer signal, the user actuates the PHONE control 32 on remote control unit 15A for switching from the TV mode to the TP mode. All three switches 32A, 32B and 32C are thereby operated to the TP position, television receiver 8 now being in an "off-hook" condition with audio receive channel 73 connected to the listen channel of the telephone network 14 through switch 32B, an input of audio amplifier 42 being connected to the audio receive channel 73 through switch 32A and the output of audio amplifier 66 being connected to audio send channel 60 through switch 32C. Off-hook signalling means 50 is connected to the telephone network 14 through switch 32B to indicate to the telephone network the off-hook condition.

The television receiver user learns that the call is for a person at a remote location serviced by an RF receiver 94. The user activates the PAGE control 33 of remote control unit 15A, which is a push to talk function, causing the third switch 32C to route the output of audio amplifier 66 to the RF transmitter 86. At the same time, switch 32A is moved to the MUTE position preventing acoustical feedback from speaker 44 to microphone 58 while switch 32B remains in the TP mode. The television receiver user gives all-over voice notification of the phone call to contact the called party.

Release of PAGE control 33 may either return the television receiver 8 to its previous mode, i.e., the TP mode, or, alternatively, operate control 15B for automatically placing the caller on hold by establishing switches 32A and 32C in the TV mode while leaving switch 32B in the TP mode. In the first case, where the TP mode is established upon release of PAGE control 33, if the paged party is unavailable the television receiver user advises the caller accordingly and then depresses the PHONE control 32 on remote control unit 15A whereby control 15B operates switches 32A, 32B and 32C for re-establishing the TV mode. If the paged party is available, the user advises the caller that the called party will answer the call through another television device. The user then waits to hear the called party answer (through receive channel 73) before depressing PHONE control 32 to re-establish the TV mode. If the user wishes to return to the TV mode but not disconnect the caller, he may depress a HOLD control 37 on remote control unit 15A thereby manually placing the call on hold as previously described. In the HOLD mode, television receiver 8 is operated in the normal TV mode while switch 32B is maintained in an off-hook condition. At the same time, control 15B preferably energizes a HOLD indicator LED 74 for providing a visual indication to the television receiver user that the caller is on HOLD. When the called party answers the call on a remote telephone device a HOLD detector 84 senses the off-hook condition thereof and couples a signal to control 15B for re-establishing switch 32B in the TV mode and for extinguishing HOLD indicator LED 74. If, after some time, the television receiver user observes that HOLD indicator LED 74 has not been extinguished (i.e. the called party has not answered the call), the TP mode may be re-established by operating PHONE control 32 and the caller is advised that the party is unavailable. Thereafter, PHONE control 32 is again operated re-establishing the TV mode and extinguishing LED 74.

In the case where release of PAGE control 33 results in the automatic establishment of the HOLD mode, a similar sequence of events is folled as described above where the HOLD mode was manually established.

Remote control unit 15B additionally provides for a MUTE function and a PRIVACY function which may be activated by depressing MUTE key 30 or PRIVACY key 31 of remote unit 15A. Operation of the MUTE function sets switch 32A to the MUTE position so as to disable the audio channel when in the TV mode while operation of the PRIVACY function forces S-R control 64 into the RECEIVE mode thereby providing user privacy by disabling TALK channel 60 when in the TP mode.

Figure 5:
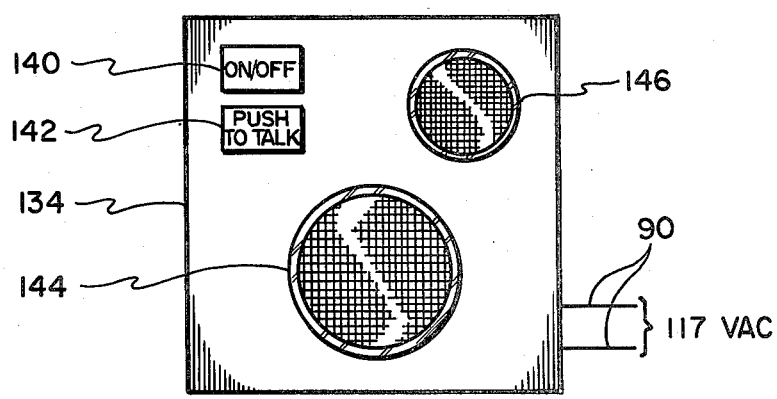
FIG. 5 illustrates a remote intercom unit operable in conjunction with the television receiver of FIG. 4.
Figure 4:
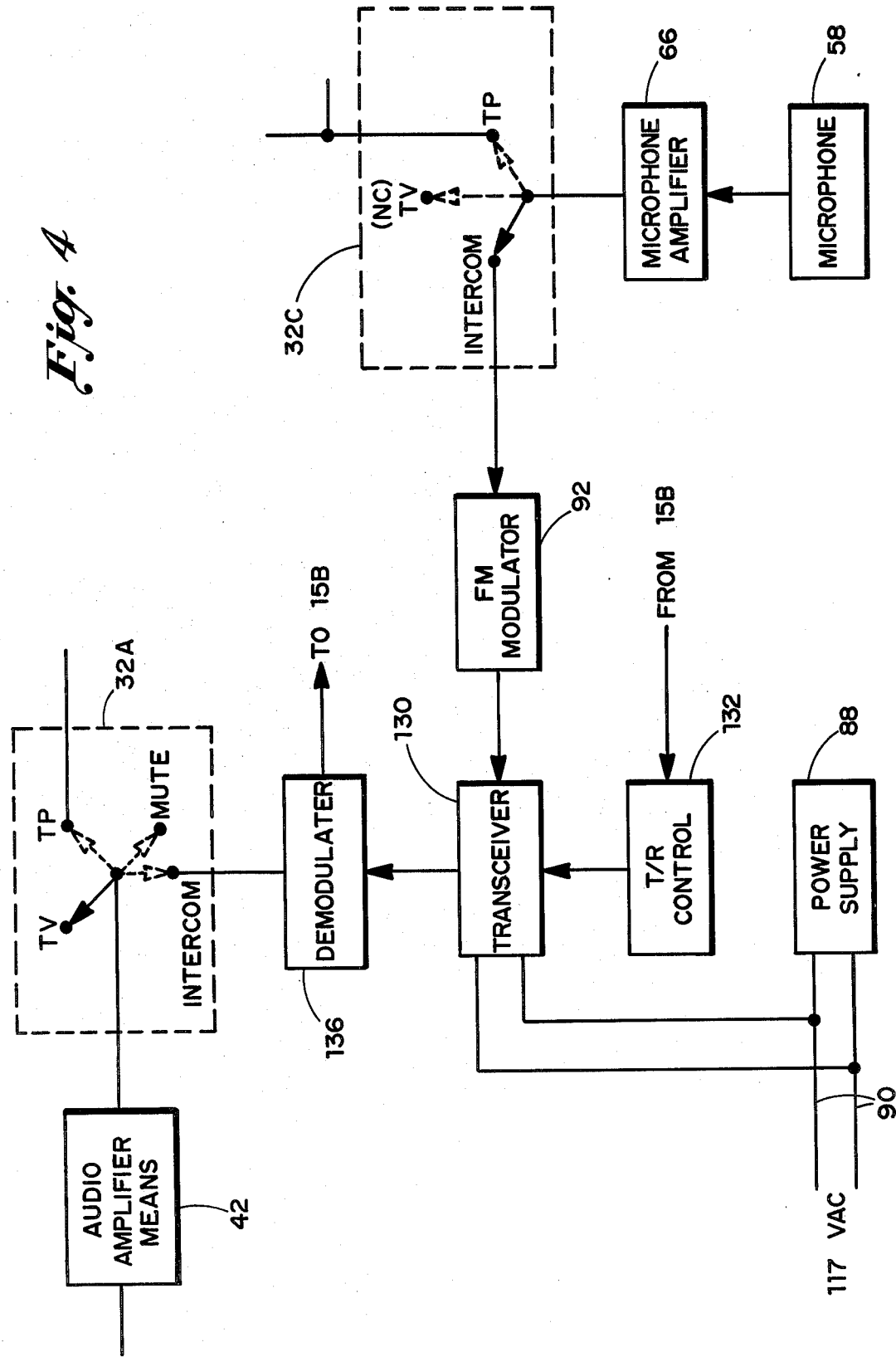
FIG. 4 is a block diagram illustrating a modification of the television receiver of FIG. 1 for providing an intercom feature according to the invention.

The annunciator feature described above may be conveniently expanded to encompass a two-way intercom feature enabling the paged party to communicate with the television receiver user. Referring to FIG. 4, the intercom feature is implemented in television receiver 8 by coupling the output of FM modulator 92 to a conventional transceiver 130, the operating mode of transceiver 130 being controlled by a transmit receive control circuit 132. One output of transceiver 130 is coupled to the household power grid 90 for transmission of voice communications from the television user to a remote intercom unit 134 (see FIG. 5) while a second output of transceiver 130 is coupled through an FM demodulator 136 and an INTERCOM position of switch 32A to audio amplifier 42 and speaker 44 for enabling transmission of voice communications from remote intercom unit 134 to the television receiver user.

In operation, assume that the television receiver user has answered an incoming telephone call as described above so that each switch 32A, 32B and 32C is in the TP position. Also assume that the incoming telephone call is for a party at a remote location. The television receiver user may page the called party by depressing the "push-to-talk" page/intercom key switch 33 of remote control unit 15A whereby remote control receiver 15B will operate T/R control 132 for placing transceiver 130 in the transmit mode and cause switches 32A and 32C to assume the MUTE and INTERCOM positions respectively. As a result, as long as the page/intercom key switch 33 of remote control unit 15A remains depressed, voice communications of the television receiver user may be coupled from microphone 58 to the remote intercom unit 134 through amplifier 66, switch 32C, FM modulator 92, transceiver 130 and the household power grid 90. As soon as the page/intercom key switch is released, transceiver 130 reverts to its receive mode of operation while both switches 32A and 32C re-assume the TP position. The television receiver user may then inform the caller that the called party has been paged and will answer the call shortly. After the call is answered by the paged party, the television receiver user may return to the TV mode of operation by depressing PHONE switch 32 of remote control unit 15A causing each of switches 32A, 32B and 32C to return to the TV position. Alternatively, upon releasing page-/intercom switch 33, switches 32A and 32C may revert to the TV position placing the caller on HOLD as previously described. Switch 32B will then re-assume the TV or ON-HOOK position in response to the paged party placing a remote telephone unit in an OFF-HOOK condition for answering the telephone call as described above. In either case, it will be appreciated that the foregoing operational sequences are largely identical to those previously described in connection with the annunciator feature of the invention. Thus, as used herein, the annunciator function should be interpreted as being encompassed by the intercom function.

Now, assume that instead of immediately answering the telephone call, the paged party wishes to communicate a message to the television receiver user. Such is facilitated by means of remotely located intercom unit 134 which comprises a conventional intercom device connected to the household power line 90. Intercom unit 134 conventionally includes a transceiver, a transmit/receiver control and a demodulator similar to the corresponding elements of FIG. 4. In addition, the remote control unit includes an ON/OFF switch 140, a "push-to-talk" switch 142, a speaker 144 and a microphone 146. As in the case of the circuit of FIG. 4, remote intercom unit 134 is in the receive mode of operation except when "push-to-talk" switch 142 is depressed wherein the unit is in the transmit mode of operation. Thus, with switch 142 undepressed, the paging message from the television receiver user is reproduced as an acoustical signal by speaker 144.

In order to respond to the paging message, the called remote party may depress "push-to-talk" switch 142 of intercom unit 134 and voice a desired response into microphone 146. As a result, the response will be transmitted as an FM modulated signal from intercom unit 134 through the household power lines 90 and will be received by transceiver 130 of television receiver 8. Transceiver 130, which is in the receive mode of operation, in turn couples the FM modulated response signal to demodulator 136. In conventional intercom devices of the type exemplified by intercom unit 134, each transmitted message is typically preceded by a special code which is adapted for detection by the demodulators of other intercom units in the intercom system. Demodulator 136 accordingly detects the special code transmitted prior to the response signal and couples a detection signal to remote control receiver 15B. In response to the detection signal, remote control receiver 15B causes switch 32A to assume the INTERCOM position and switch 32C to assume the TV position. The demodulated response signal is accordingly coupled through switch 32A and audio amplifier 42 for reproduction by speaker 44 of the television receiver. The conversation between the television receiver user and the paged party may continue as long as desired with each party depressing his "push-to-talk" switch to enable a transmission mode and otherwise assuming a receive mode. Upon completion of the conversation, the television receiver user may either return to the TV or TP mode as described above.

In connection with the foregoing, it will be appreciated that either the annunciator or intercom feature of the invention as described herein may be practiced independently of the telephone mode of operation of television receiver 8. Thus, for example, the television receiver user may selectively interrupt the television audio to page or conduct a conversation with a remote party by suitably operating page/intercom key switch 33 of remote control transmitter 15A.

While a particular embodiment of the invention has been shown and described, it will be obvious to those skilled in the art that changes and modifications may be made without departing from the invention in its broader aspects. For example, while the use of LED's is described to provide visual indications of the various modes of the television receiver it will be apparent that various other forms of visual indication may be provided. Thus, visual indication of the operating modes of the receiver may be provided by means of a suitable character generator operated for causing an appropriate message to be displayed on picture display 38 identifying the current mode of operation. Therefore, the aim in the appended claims is to cover all such changes and modifications as fall within the true spirit and scope of the invention.

We claim:

1. A combined television, telephone and annunciator system housed within a unitary television cabinet comprising:

video signal processing and display means responsive to a received television signal for producing a video display image corresponding to the video component thereof;

audio signal processing means responsive to a received television signal for producing an audio signal corresponding to the audio component thereof;

audio output means comprising audio amplifier means and speaker means, said audio output means being operable for converting said audio signal to a corresponding acoustical signal;

telephone network access means operable for providing a two-way telephone conversation link between a user of said combined system and a telephone caller, said two-way telephone link comprising a listen channel including said audio output means and a talk channel including microphone means disposed within said cabinet in close proximity with said speaker means;

annunciator means operable in cooperation with said microphone means for transmitting a message voiced by the user of said system to a remote location, said transmitted message being excluded from said audio output means;

at least one remotely located receiver for receiving and reproducing said transmitted message; and user-controlled switching means for selectively controlling said combined system for operation in a first mode wherein said audio output means is operated for converting said audio signal to said corresponding acoustical signal, in a second mode wherein said two-way telephone conversation link is established in response to an incoming telephone call and in a third mode wherein said audio output means is muted to prevent acoustical feedback from said speaker means to said microphone means while said annunciator means is operated for announcing said incoming telephone call to a remotely located party by transmitting a selected message voiced by the user of said combined system for reproduction by said remotely located receiver.

2. The combined television, telephone and annunciator system of claim 1 wherein said user-controlled switching means comprises a hand-held remote control transmitter including mode selection means selectively operable for designating a desired one of said operating modes and circuit means responsive to said remote control transmitter for operating said combined system in the mode designated thereby.

3. The combined television, telephone and annunciator system of claim 2 wherein said circuit means comprises means for automatically re-establishing operation of said combined system in one of said first and second mode substantially immediately after the completion of operation of said combined system in said third mode.

4. The combined television, telephone and annunciator system of claim 2 wherein said circuit means comprises means for automatically establishing operation of said combined system in a fourth mode substantially immediately after the completion of operation of said combined system in said third mode, said fourth mode comprising a hold mode wherein said two-way telephone link is established with said talk and listen channels being disabled and said audio output means being operated for converting said audio signal to said corresponding acoustical signal.

5. The combined television, telephone and annunciator system of claim 4 including means for providing a visual indication of the user of said combined system of the operation thereof in said fourth mode and means responsive to an off-hook condition of a remote telephone device for breaking said two-way telephone link and extinguishing said visual indication.

6. The combined television, telephone and annunciator system of claim 2 wherein a commercial power grid network is used for providing operating power therefor and wherein said annunciator means comprises transmitting means operable in cooperation with said microphone means for transmitting a message voiced by the user of said combined system as a modulated radio frequency signal through said power grid network, said at least one remotely located receiver comprising a radio frequency receiver coupled to said power grid network and including a speaker for converting said transmitted message to a corresponding acoustical signal.

7. The method of operating a home communications system housed within a unitary cabinet comprising:

operating the video and audio signal processing circuits of a television receiver for viewing and listening to the video and audio components of a received television signal;

providing an alerting signal through the speaker of the audio circuit of said television receiver for indicating an incoming telephone call;

establishing a two-way telephone conversation link between the viewer of said television receiver and the telephone caller, said two-way telephone link comprising a listen channel operating through the speaker of said television receiver audio circuit and a talk channel including microphone means disposed within said cabinet in close proximity with said speaker; and using said microphone means to transmit a message through the home power grid system and which is excluded from the television receiver audio circuit for announcing the telephone call to a location remote from said television receiver while muting the television receiver audio circuit to prevent acoustical feedback from said speaker to said microphone means.

8. The method of claim 7 including the step of automatically re-establishing said two-way telephone conversation link substantially immediately after the completion of said announcing step.

9. The method of claim 7 including the step of placing said incoming telephone call on hold and providing an indication thereof while operating said television receiver substantially immediately after the completion of said announcing step.

10. The method of claim 9 including the step of removing said incoming telephone call from hold in response to an off-hook condition of a remote telephone device for breaking said two-way telephone conversation link while extinguishing said indication.

11. A home communications system housed within a unitary cabinet comprising:

means developing a baseband audio signal;

audio output means including an acoustical speaker operable for converting said baseband audio signal to a corresponding acoustical signal;

telephone network access means operable for providing a two-way telephone conversation link between a user of said communications system and a telephone caller, said two-way telephone link comprising a listen channel including said audio output means and a talk channel including microphone means disposed within said cabinet in close proximity with said speaker;

annunciator means operable in cooperation with said microphone means for transmitting a message voiced by the user of said communications system to a remote location, said transmitted message being excluded from said audio output means;

at least one remotely located receiver for receiving and reproducing said transmitted message; and remotely operable user-controlled switching means for selectively controlling said communications system for operation in a first mode wherein said audio output means is operated for converting said audio signal to said corresponding acoustical signal, in a second mode wherein said two-way telephone conversation link is established in response to an incoming telephone call and in a third mode wherein said audio output means is muted to prevent acoustical feedback from said speaker to said microphone means while said annunciator means is operated for announcing said incoming telephone call to a remotely located party by transmitting a selected message voiced by the user of said communication system for reproduction by said remotely located receiver.

12. A home communications system housed within a unitary cabinet comprising:

means developing a baseband audio signal;

audio output means including an acoustical speaker operable for converting said baseband audio signal to a corresponding acoustical signal;

telephone network access means operable for providing a two-way telephone conversation link between a user of said communications system and a telephone caller, said two-way telephone link comprising a listen channel including said audio output means and a talk channel including microphone means disposed within said cabinet in close proximity with said speaker;

annunciator means operable in cooperation with said microphone means for transmitting a message voiced by the user of said communications systems to a remote location, said transmitted message being excluded from said audio output means;

at least one remotely located receiver for receiving and reproducing said transmitted message; and user-controlled switching means for selectively controlling said communications system for operation in a first mode wherein said audio output means is operated for converting said audio signal to said corresponding acoustical signal, in a second mode wherein said two-way telephone conversation link is established in response to an incoming telephone call and in a third mode wherein said audio output means is muted to prevent acoustical feedback from said speaker to said microphone means while said annunciator means is operated for announcing said incoming telephone call to a remotely located party by transmitting a selected message voiced by the user of said communications system for reproduction by said remotely located receiver;

said switching means further comprising means for automatically re-establishing operation of said communications system in one of said first or second modes substantially immediately after the completion of operation of said communications system in said third mode.

13. A home communications system housed within a unitary cabinet comprising:

means developing a baseband audio signal;

audio output means including an acoustical speaker operable for converting said baseband audio signal to a corresponding acoustical signal;

telephone network access means operable for providing a two-way telephone conversation link between a user of said communications system and a telephone caller, said two-way telephone link comprising a listen channel including said audio output means and a talk channel including microphone means disposed within said cabinet in close proximity with said speaker;

annunciator means operable in cooperation with said microphone means for transmitting a message voiced by the user of said communications systems to a remote location;

at least one remotely located receiver for receiving and reproducing said transmitted message;

user-controlled switching means for selectively controlling said communications system for operation in a first mode wherein said audio output means is operated for converting said audio signal to said corresponding acoustical signal, in a second mode wherein said two-way telephone conversation link is established in response to an incoming telephone call and in a third mode wherein said audio output means is muted while said annunciator mans is operated for announcing said incoming telephone call to a remotely located party for transmitting a selected message voiced by the user of said communications system for reproduction by said remotely located receiver;

said switching means further comprising means for automatically establishing operation of said communications system in a fourth mode substantially immediately after the completion of operation of said communications system in said third mode, and fourth mode comprising a hold mode wherein said two-way telephone link is established with said talk and listen channels being disabled and said audio output means being operated for converting said audio signal to said corresponding acoustical signal; and means for providing a visual indication of the user of said communications system of the operation thereof in said fourth mode and means responsive to an off-hook condition of a remote telephone device for breaking said two-way telephone link and extinguishing said visual indication.

14. A home communications system housed within a unitary cabinet comprising:

means developing a baseband audio signal;

audio output means including an acoustical speaker operable for converting said baseband audio signal to a corresponding acoustical signal;

telephone network access means operable for providing a two-way telephone conversation link between a user of said communications system and a telephone caller, said two-way telephone link comprising a listen channel including said audio output means and a talk channel including microphone means disposed within said cabinet in close proximity with said speaker;

annunciator means operable in cooperation with said microphone means for transmitting a message voiced by the user of said communications systems to a remote location;

at least one remotely located receiver for receiving and reproducing said transmitted message;

user-controlled switching means for selectively controlling said communications system for operation in a first mode wherein said audio output means is operated for converting said audio signal to said corresponding acoustical signal, in a second mode wherein said two-way telephone conversation link is established in response to an incoming telephone call and in a third mode wherein said audio output means is muted while said annunciator mans is operated for announcing said incoming telephone call to a remotely located party by transmitting a selected message voiced by the user of said communications system for reproduction by said remotely located receiver;

said switching means further comprising means for automatically establishing operation of said communications system in a fourth mode substantially immediately after the completion of operation of said communications system in said third mode, said fourth mode comprising a hold mode wherein said two-way telephone link is established with said talk and listen channels being disabled and said audio output means being operated for converting said audio signal to said corresponding acoustical signal; and means for providing a visual indication to the user of said communications system of the operation thereof in said fourth mode and means responsive to an off-hook condition of a remote telephone device for extinguishing said visual indication;

said user controlled switching means comprising a hand-held remote control transmitter including mode selection means selectively operable for designating a desired one of said operating modes and circuit means responsive to said remote control transmitter for operating said communications system in the mode designated thereby.

15. The method of operating a home communications system housed within a unitary cabinet comprising:

operating an audio signal processing device including an acoustical speaker for producing an output acoustical signal;

providing an alerting signal through said acoustical speaker for indicating an incoming telephone call;

establishing a two-way telephone conversation link between the user of said communications system and the telephone caller, said two-way telephone link comprising a listen channel operating through said acoustical speaker and a talk channel including microphone means disposed within said cabinet in close proximity with said speaker; and using said microphone means to transmit a message through the home power grid system and which is excluded from the audio signal processing device for announcing the telephone call to a location remote from said communications system while muting said audio signal processing device to prevent acoustical feedback from said speaker to said microphone means.

16. The method of operating a home communications system housed within a unitary cabinet comprising:

operating an audio signal processing device including an acoustical speaker for producing an output acoustical signal;

providing an alerting signal through said acoustical speaker for indicating an incoming telephone call;

establishing a two-way telephone conversation link between the user of said communications system and the telephone caller, said two-way telephone link comprising a listen channel operating through said acoustical speaker and a talk channel including microphone means disposed within said cabinet in close proximity with said speaker;

using said microphone means to transmit a message through the home power grid system and which is excluded from the audio signal processing device for announcing the telephone call to a location remote from said communications system while muting said audio signal processing device to prevent acoustical feedback from said speaker to said microphone means; and re-establishing said two-way telephone conversation link substantially immediately after the completion of said announcing step.

17. The method of operating a home communications system housed within a unitary cabinet comprising:

operating an audio signal processing device including an acoustical speaker for producing an output acoustical signal;

providing an alerting signal through said acoustical speaker for indicating an incoming telephone call;

establishing a two-way telephone conversation link between the user of said communications system and the telephone caller, said two-way telephone link comprising a listen channel operating through said acoustical speaker and a talk channel including microphone means disposed within said cabinet in close proximity with said speaker;

using said microphone means to transmit a message through the home power grid system for announcing the telephone call to a location remote from said communications system while muting said audio signal processing device;

placing the incoming telephone call on hold while operating said audio signal processing device substantially immediately after the completion of said announcing step;

providing a visual indication to the user of said communications system that said incoming telephone call has been placed on hold; and extinguishing said visual indication and breaking said two-way telephone link in response to an off-hook condition of a remote telephone device.

18. A combined television, telephone and intercom system housed within a unitary television cabinet comprising:

video signal processing and display means responsive to a received television signal for producing a video display image corresponding to the video component thereof;

audio signal processing means responsive to a received television signal for producing an audio signal corresponding to the audio component thereof;

audio output means comprising audio amplifier means and speaker means, said audio output means being operable for converting said audio signal to a corresponding acoustical signal;

telephone network access means operable for providing a two-way telephone conversation link between a user of said combined system and a telephone caller, said two-way telephone link comprising a listen channel including said audio output means and a talk channel including microphone means disposed within said cabinet in close proximity with said speaker means;

first and second intercom means operable for providing a two-way intercom conversation link between the user of said combined system and a remotely located party, said first intercom means including means for muting said audio output means to prevent acoustical feedback from said speaker to said microphone means while said microphone means is operated for transmitting a message voiced by the user of said combined system and which is excluded from said audio output means, said first intercom means further including said audio output means for reproducing a message voiced by said party; and user-controlled switching means for selectively controlling said combined system for operation in a first mode wherein said audio output means is operated for converting said audio signal to said corresponding acoustical signal, in a second mode wherein said two-way telephone conversation link is established in response to an incoming telephone call and in a third mode wherein said two-way intercom conversation link is established without disconnecting a previously established two-way telephone conversation link.

19. The combined television, telephone and intercom system of claim 18 wherein said user-controlled switching means comprises a hand-held remote control transmitter including mode selection means selectively operable for designating a desired one of said operating modes and circuit means responsive to said remote control transmitter for operating said combined system in the mode designated thereby.

20. The combined television, telephone and intercom system of claim 19 wherein said circuit means comprises means for automatically re-establishing operation of said combined system in one of said first or second modes substantially immediately after the completion of operation of said combined system in said third mode.

21. A combined television, telephone and annunciator system housed within a unitary television cabinet comprising:

video signal processing and display means responsive to a received television signal for producing a video display image corresponding to the video component thereof;

audio signal processing means responsive to a received television signal for producing an audio signal corresponding to the audio component thereof;

audio output means comprising audio amplifier means and speaker means, said audio output means being operable for converting said audio signal to a corresponding acoustical signal;

telephone network access means operable for providing a two-way telephone conversation link between a user of said combined system and a telephone caller, said two-way telephone link comprising a listen channel including said audio output means and a talk channel including microphone means disposed within said cabinet in close proximity with said speaker means;

annunciator means operable in cooperation with said microphone means for transmitting a message voiced by the user of said system to a remote location;

at least one remotely located receiver for receiving and reproducing said transmitted message; and user-controlled switching means for selectively controlling said combined system for operation in a first mode wherein said audio output means is operated for converting said audio signal to said corresponding acoustical signal, in a second mode wherein said two-way telephone conversation link is established in response to an incoming telephone call and in a third mode wherein said audio output means is muted while said annunciator means is operated for announcing said incoming telephone call to a remotely located party by transmitting a selected message voiced by the user of said combined system for reproduction by said remotely located receiver;

said user-controlled switching means comprising a hand-held remote control transmitter including mode selection means selectively operable for designating a desired one of said operating modes and circuit means responsive to said remote control transmitter for operating said combined system in the mode designated thereby; and said circuit means comprising means for automatically establishing operation of said combined system in a fourth mode substantially immediately after the completion of operation of said combined system in said third mode, said fourth mode comprising a hold mode wherein said two-way telephone link is established with said talk and listen channels being disabled and said audio output means being operated for converting said audio signal to said corresponding acoustical signal.

22. A combined television, telephone and annunciator system housed within a unitary television cabinet comprising:

video signal processing and display means responsive to a received television signal for producing a video display image corresponding to the video component thereof;

audio signal processing means responsive to a received television signal for producing an audio signal corresponding to the audio component thereof;

audio output means comprising audio amplifier means and speaker means, said audio output means being operable for converting said audio signal to a corresponding acoustical signal;

telephone network access means operable for providing a two-way telephone conversation link between a user of said combined system and a telephone caller, said two-way telephone link comprising a listen channel including said audio output means and a talk channel including microphone means disposed within said cabinet in close proximity with said speaker means;

annunciator means operable in cooperation with said microphone means for transmitting a message voiced by the user of said system to a remote location;

at least one remotely located receiver for receiving and reproducing said transmitted message; and user-controlled switching means for selectively controlling said combined system for operation in a first mode wherein said audio output means is operated for converting said audio signal to said corresponding acoustical signal, in a second mode wherein said two-way telephone conversation link is established in response to an incoming telephone call and in a third mode wherein said audio output means is muted while said annunciator means is operated for announcing said incoming telephone call to a remotely located party by transmitting a selected message voiced by the user of said combined system for reproduction by said remotely located receiver;

said user-controlled switching means comprising a hand-held remote control transmitter including mode selection means selectively operable for designating a desired one of said operating modes and circuit means responsive to said remote control transmitter for operating said combined system in the mode designated thereby; and said circuit means comprising means for automatically establishing operation of said combined system in a fourth mode substantially immediately after the completion of operation of said combined system in said third mode, said fourth mode comprising a hold mode wherein said two-way telephone link is established with said talk and listen channels being disabled and said audio output means being operated for converting said audio signal to said corresponding acoustical signal and including means for providing a visual indication to the user of said combined system of the operation thereof in said fourth mode and means responsive to an off-hook condition of a remote telephone device for breaking said two-way telephone link and extinguishing said visual indication.

23. The method of operating a home communications system housed within a unitary cabinet comprising:

operating the video and audio signal processing circuits of a television receiver for viewing and listening to the video and audio components of a received television signal;

providing an alerting signal through the speaker of the audio circuit of said television receiver for indicating an incoming telephone call;

establishing a two-way telephone conversation link between the viewer of said television receiver and the telephone caller, said two-way telephone link comprising a listen channel operating through the speaker of said television receiver audio circuit and a talk channel including microphone means disposed within said cabinet in close proximity with said speaker;

using said microphone means to transmit a message through the home power grid system for announcing the telephone call to a location remote from said television receiver while muting the television receiver audio circuit; and placing said incoming telephone call on hold and providing an indication thereof while operating said television receiver substantially immediately after the completion of said announcing step.

24. The method of operating a home communications system housed within a unitary cabinet comprising:

operating the video and audio signal processing circuits of a television receiver for viewing and listening to the video and audio components of a received television signal;

providing an alerting signal through the speaker of the audio circuit of said television receiver for indicating an incoming telephone call;

establishing a two-way telephone conversation link between the viewer of said television receiver and the telephone caller, said two-way telephone link comprising a listen channel operating through the speaker of said television receiver audio circuit and a talk channel including microphone means disposed within said cabinet in close proximity with said speaker;

using said microphone means to transmit a message through the home power grid system for announcing the telephone call to a location remote from said television receiver while muting the television receiver audio circuit;

placing said incoming telephone call on hold and providing an indication thereof while operating said television receiver substantially immediately after the completion of said announcing step; and removing said incoming telephone call from hold in response to an off-hook condition of a remote telephone device for breaking said two-way telephone conversation link while extinguishing said indication.

* * * * *